Oct. 26, 1965 F. LOUZIL 3,214,108

TAKE UP ARRANGEMENT FOR TAPE RECORDERS

Filed March 7, 1962 2 Sheets-Sheet 1

INVENTOR
FRIEDRICH LOUZIL
BY
Frank R. Trifari
AGENT

Oct. 26, 1965 F. LOUZIL 3,214,108

TAKE UP ARRANGEMENT FOR TAPE RECORDERS

Filed March 7, 1962 2 Sheets-Sheet 2

INVENTOR
FRIEDRICH LOUZIL

BY [signature]
AGENT

United States Patent Office 3,214,108
Patented Oct. 26, 1965

3,214,108

TAKE UP ARRANGEMENT FOR TAPE RECORDERS

Friedrich Louzil, Vienna, Austria, assignor to North American Philips Company, Inc., New York, N.Y., a corporation of Delaware Filed Mar. 7, 1962, Ser. No. 178,075
Claims priority, application Austria, Mar. 10, 1961, A 1,983/61
5 Claims. (Cl. 242—55.12)

The invention relates to an apparatus for a band-shaped recording carrier (tape) in which the tape is taken up by a flanged reel the flanges of which have recesses the edges of which are oblique and which extend into the reel hub.

In such reels the beginning of the tape to be taken up may readily be attached to the hub. For this purpose the tape is provided with a tag the width of which exceeds both the width of the tape and the spacing between the inner surfaces of the flanges. When such a tag is caused to enter a recess having oblique edges and the reel is driven in a direction determined by the direction of the edges of the recesses extending obliquely from the reel hub, the tag is caught by said edges which when viewed in the direction of rotation are behind it and is carried along by them to the reel hub where it is held.

To attach a tape tag to the hub of such a take-up reel by hand is very simple. However, attaching becomes difficult when the orifices of the recesses are not accessible in every position of the reel, and attachment is impossible when the take-up reel is non-detachable and is disposed in the apparatus so as to be completely covered. Further it is not readily possible to attach the beginning of the tape to a rotating reel.

A recorder-reproducer arrangement for automatic tape take-up is known from application Serial No. 125,603, now Patent No. 3,119,574, in the name of Friedrick Laa. This invention relates to another arrangement for the automatic take-up of magnetic tape recorders-reproducers having certain advantages thereover.

According to the invention in an apparatus for a band-shaped recording carrier (tape) having a flanged take-up reel the flanges of which are provided with recesses extending from the flange rims into the reel hub and having oblique edges so that a tape provided at its beginning with a tag the width of which exceeds both the tape width and the spacing between the inner surfaces of the reel edges, after having been brought into the recesses is carried along on rotation of the reel, moved towards the reel hub and held there, the edges of the recesses which carry the tag along when the tape is taken up project beyond the flange rims, while at least along part of the circumference of the flanges a preferably stationary wall part is provided which together with the flange rims constitutes a guiding channel for the tape tag which channel extends in the longitudinal direction of the tape and in which the tag is adapted to move with a certain amount of play, enabling the tag to be carried along by the projecting edges of the reel flanges when it is moved into the channel.

It is of particular advantage to use a reel in which the recesses adjacent the projecting edges and, as the case may be, in the rim portions along the reel circumference extend throughout the reel flanges and form completely apertured flange portions the distance between the outer surfaces of the flanges of said apertured flange portions at most being equal to the width of the tape tag and at the same time the wall portion which together with the flange rims constitutes the guiding channel for the tape tag being shaped in the form of a U, the distance between the inner surfaces of the limbs of the U being equal to the width of the tape tag while the limbs at least overlap the projecting flange portions but preferably extend as far as the flange apertures so that these apertures when passing the wall parts are closed so as to form a chamber.

In a suitable further embodiment the wall parts overlapping the reel flanges are also prolonged in the direction from which the tape tag is to be introduced into the guiding channel formed by them and, by the provision of a further wall part disposed outside the area covered by the projecting flange portions, they are shaped into the form of a guide member completely surrounding the tape tag to be introduced, while preferably either the end of the wall part near the reel is shaped so as to be capable of guiding the tape or a separate tape guiding member, for example a roller, a pin or the like, is provided.

Further appropriate modifications will be described hereinafter with reference to the embodiments given by way of example.

The special advantage of an apparatus in accordance with the invention is that it enables tapes having differently shaped tags to be used, provided that the tags exceed the spacing between the inner surfaces of the flanges. There is complete freedom with respect to the manner in which the tag is introduced into the guiding channel constituted by the wall parts and the flange rims. It may be introduced into the channel either manually or with the aid of a special member. During the introduction the reel may be running.

The invention will now be described in detail with reference to embodiments given by way of example. However, the exclusive rights claimed are not restricted to the said embodiments.

In the drawing, FIG. 1 is a simplified plan view of an arrangement according to the subject invention.

FIG. 3 is a plan view of a preferred arrangement according to the embodiment of this invention with a part removed as hereinafter explained in describing this figure, and.

FIG. 4 is a sectional view taken on the line IV—IV of FIG. 3.

FIG. 5 shows another sectional view of FIG. 3 taken on the line V—V.

FIG. 6 shows a tape tag. The tape tag may be of the type known from application Serial No. 125,603.

Figure 2:
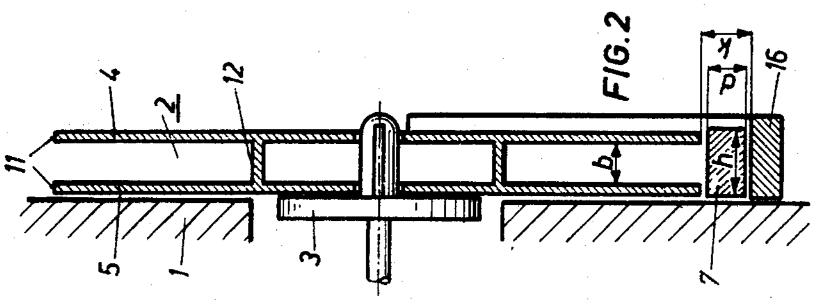
FIG. 2 is a sectional view taken along the line II—II of FIG. 1.
Figure 1:
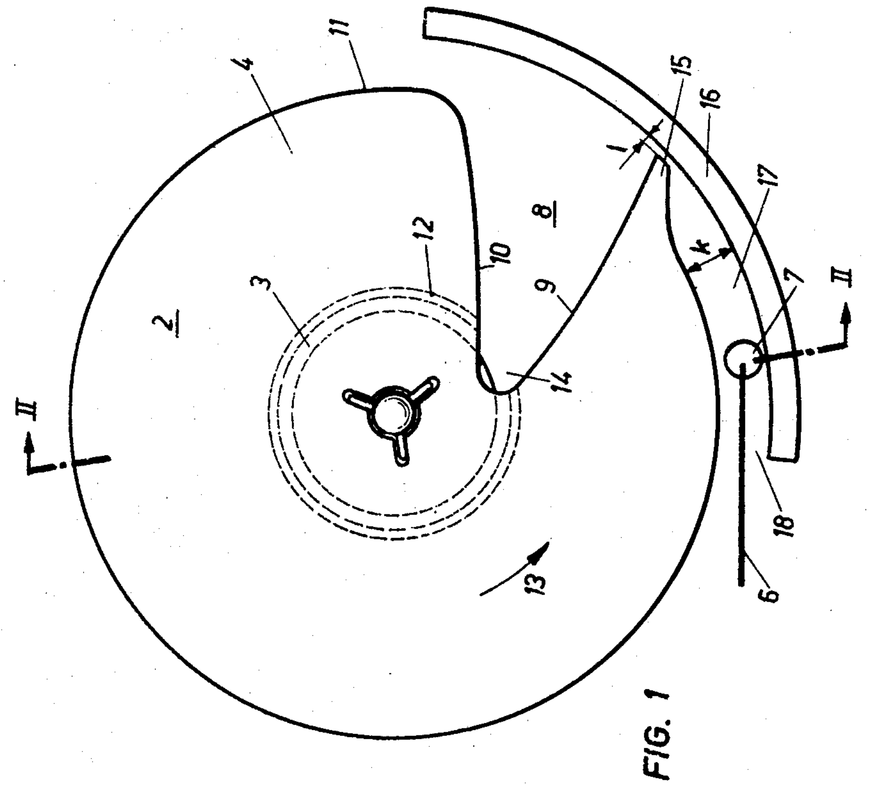

In the arrangement shown in FIGS. 1 and 2 a flanged reel generally designated 2 is supported above a base plate 1 (FIG. 2) by a turn-table 3 adapted to be driven in a usual manner. The spacing *b* (FIG. 2) between the inner surfaces of flanges 4 and 5 matches the width of a tape 6. The tape is provided at its beginning with a tag 7 made, for example, of synthetic resin by gluing the tape in a groove of the tag. The cylindrical shape shown is not necessary at all but any suitable shape may be used. The sole condition is that the dimension *h* must at least be greater than the spacing *b*. The two flanges have recesses in the form of slots 8 which viewed in a direction at right angles to the plane of the flanges are aligned one exactly above the other and have corresponding oblique edges 9 and 10. The slots 8 extend from the flange rims 11 into the reel body 12. Viewed in a direction from the reel body 12 towards the flange rims 11 the edges 9 and 10 extend in a direction equal to the direction of rotation of the reel for taking up a tape as indicated by an arrow 13. Once the tape tag 7 engages the edges 9 the latter constitute an inclined plane for the tag along which it slides into a recess 14 formed in the reel hub 12. The edges 9 have a portion extending beyond the flange rims 11 so as to form a projection 15 in the embodiment shown. However, the edges 9 may be extended in any suitable manner, for example, by the insertion in hub 12 of rods defining edges 9 and projecting beyond the flange rims 11. The projection 15 to the rear of edges 9 may be given any suitable shape. Along part of the flange circumference 11 a wall 16 is disposed so as to be spaced therefrom by a distance such that the tape tag 7 is adapted to move with a certain amount of play in the resulting guiding channel 17. The wall part 16 is attached to the base plate 1 (FIG. 2) rigidly with respect to the reel 2. Frequently it may be of advantage for the wall part 16 to be attached to the base plate so as to be adapted to swing or slide relatively to the reel. Thus the guiding channels 17 may be adapted to different tape tags or may be formed at an appropriate instant. The tape tag need not substantially fill the space between the wall 16 and the flange rims 11 nor need the projections 15 substantially extend up to the wall 16. A tape tag is carried along when the width $k$ of the channel 17 is less than the sum of the thickness $d$ of the tag 7 and the length $(k-L)$ of the projection 15. The tape may have a thickness exceeding the width $k$ of the channel 17 since the tape width is no greater than the space $b$ between flanges 4 and 5.

If at the instant at which the tag 7 has been introduced into the channel 17 the projection 15 is already in front of the tag, as shown in FIG. 1, the tag 7 is caught at the next revolution of the reel and is guided towards the reel hub. If at the instant at which the tape is introduced the slot 8 is near the entrance 18 of the channel, the tape is either carried along immediately when the reel is already rotating or it is carried along as soon as the reel starts to rotate. The likelihood of the tape tag being dropped from the slot 8 when the reel is stationary may be counteracted by moving the tag 7 so far into the channel 17 as to lie in front of the edges 10. However, this likelihood may alternatively be completely eliminated by the modifications of the arrangement which are described hereinafter with reference to FIGS. 3 and 4 and in which further important advantages are obtained.

Figures 3, 4, 5, 6:
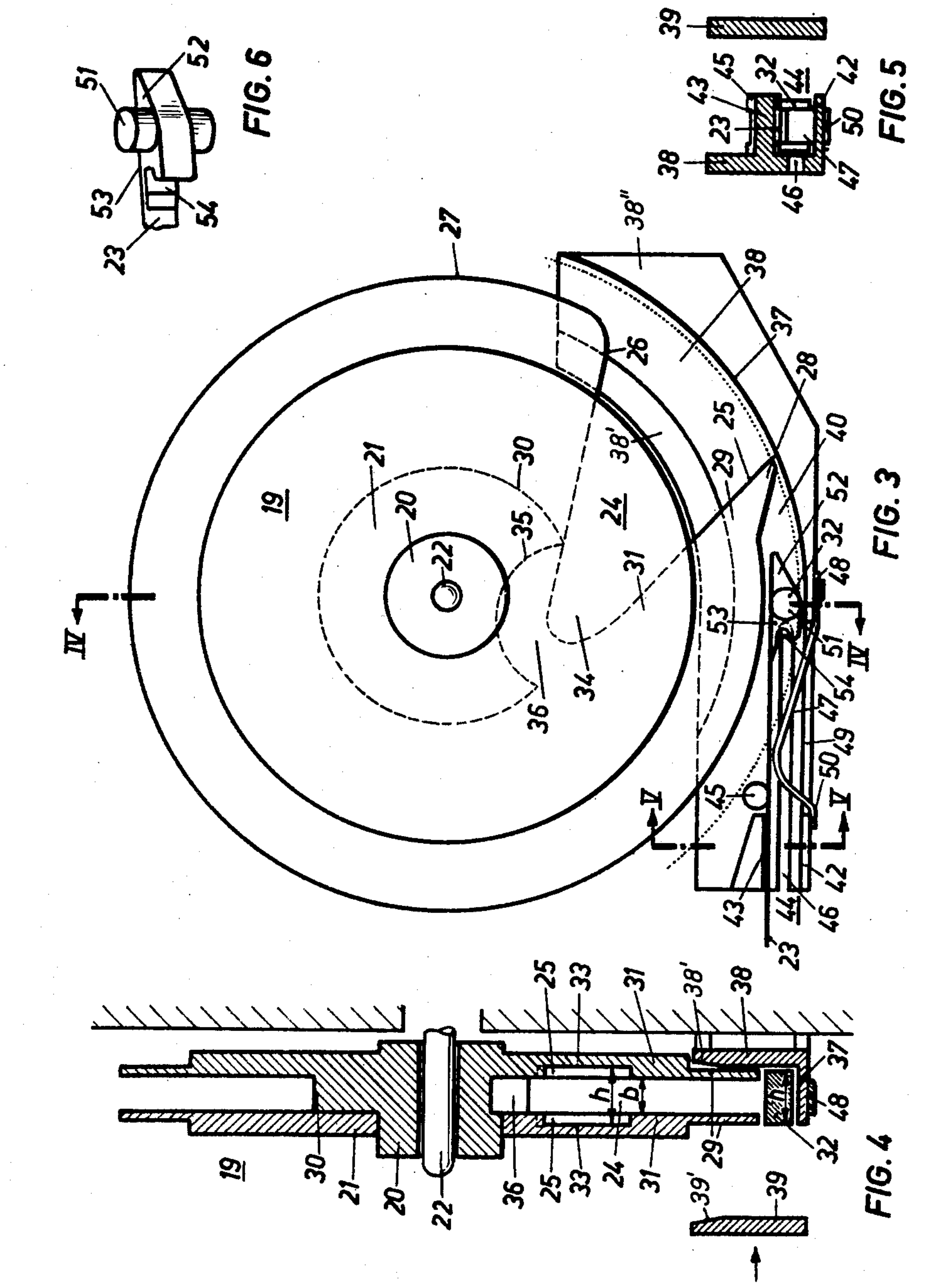

In the arrangement shown in FIGS. 3, 4 and 5 a take-up reel, generally designated 19, is constituted by two parts 20 and 21 secured together and to a common driving shaft 22. The spacing $b$ between the inner surfaces of the flanges is again matched to the width of a tape 23. The flanges 31 of parts 20 and 21 are thickened over a portion of their length as best seen in FIG. 4. The reel shown in FIGS. 3 and 4 can be thought of as a reel similar to that seen in FIGS. 1 and 2 with a plate of less diameter juxtaposed at each side thereof. Thus, instead of a slot extending from the periphery of the flanges to the hub of the reel as element 8 in FIG. 1, the slot 24 in FIG. 3 is open only through the thin part 29 of the flanges. In FIG. 4 then the surface designated 33 would be the inner surface of the juxtaposed plates but is in fact the bottom surface of the recess formed in the thickened flange parts 20, 21. These surfaces 33 guide the tag 32 whereas the surfaces or edges 25 and 26 of the slot engage the rollers 51 of the tag. Therefore, the space between the projections 28 on the rim 29 is equal to or in view of dimensional tolerances, slightly smaller than the width $h$ of a tape tag 32. In the thickened flange portion 31, however, the inner surfaces are undercut or recessed so that surfaces 33 are spaced apart by a distance slightly exceeding the width $h$ of the tape tag 32. Thus a chamber is formed between the flange portions 31 which includes the inner end 34 of the recess 24 extending into the hub 30. Along a circle 35, the radius of which is determined by the dimensions of the tape tag 32, an indentation 36 is formed in the hub in order to allow the tape tag 32 to perform any necessary swinging movement, as will be described more fully hereinafter. In the manner known from Serial No. 155,440 the edges 25 and 26 are designed so as to ensure that when the tape is unwound again the tag leaving the hub is not impeded by the edges of the gap.

Along part of the flange rims 27 a wall 37 is again provided which together with two plates 38 and 39 (FIGS. 4 and 5. In FIG. 3 plate 39 has been removed in order to illustrate plate 38 in full lines) arranged parallel to the flange rims 29 constitutes a U-shaped member. The plate 38 and the integral wall part 38'' provide a curved surface 37 over which the tag 32 is forced by the projections 28 in order to guide the tag into the reel slot. The plate 38 may be part of the recorder or fixed to the recorder disc, but the plate 39 is removable so as to render the guiding channel 40 accessible from above. In operation spacing between the inner surfaces of the two plates 38 and 39 forming the limbs of the U is equal to the width $h$ of the tape tag 32. The plates 38 and 39 extend over the outer flange portions or rim 29 to substantially the full length thereof. The inner edges of the plates 38 and 39 are slightly bevelled along surfaces 38' and 39' respectively facing the flanges. Similarly the surfaces between flanges 31 or rim portion 29 are slightly bevelled (not shown) facilitating the passage of a tape tag from the U-shaped wall part 38 and plate 39 into the recess 24 enclosed by the flange portions 31. As long as the recess 24 opens within the U-shaped wall part 38 and plate 39 the recess 24 formed in the flange surfaces 28 and 29 constitutes an enclosed chamber.

Both the curved wall portion 37 and the wall portions 38 and 39 are prolonged in the direction from which the tape tag 32 is introduced into the guiding channel 40. The extension of the wall portion 37 has the form of a straight wall portion 42 extending substantially tangentially. Between the wall portions 38 and 39 a further wall portion 43 is arranged parallel to the wall portion 42 so as to produce a completely enclosed guiding channel 44 into which the tape tag is introduced. A pin 45, serving as a tape guide member, is arranged at the end of the wall portion 43 facing the reel. Instead of this pin a roller or the like may be used but the end of the wall portion 43 may also be designed and utilized as a tape guide. Obviously the member 45 must be located outside the area shown by a dotted line indicating the path of the projection 28. The wall 38 is provided with a slit 46 (FIG. 5) which extends from the outer end of the guiding channel 44 into the guiding channel 40 so that a driving member (as known from Serial No. 125,603) adapted to move the tape tag can pass through slit 46 and convey the tape tag through channel 44 and into channel 40. Obviously the slit 46 may be formed in the wall parts 42 or 39.

In order to prevent the tape tag introduced into the guide channel (17 in FIG. 1, 40 in FIG. 3) from slipping out accidentally, a safeguard is suitably provided at the entrance of the guide channel, preferably in the form of a catch which narrows the cross-sectional area of the channel and either may be resilient, so as to enable the tape tag entering the channel or leaving it (due to a force exerted on it) to overcome the resistance of the catch, or may be adapted to be controlled by suitable means initiating the winding or unwinding operation. Since the projecting flange portions 15 (FIG. 1) or 28 (FIG. 3) respectively are spaced apart from one another by a distance equal to the tape width, a locking member may readily be arranged in the chamber between the spool flanges and the wall portions 16 and/or 37, for example through an aperture formed in the said wall portion or immediately in front of the open end of the guiding channel (FIG. 3). With record carriers operating on a non-magnetic principal the tape tag may be made of ferromagnetic material so as to be held by a magnet provided on the wall part.

In a particularly simple and advantageous form, the catch is a curved leaf spring fixed at one end. Such a spring is provided in the arrangement shown in FIGS. 3 and 5; it is designated 47. One end 48 of the spring 47 is secured to the wall 37 near the inlet end of the guiding channel 40. The portion of the spring between the ends is curved towards the flange rims 27. In this simple form the spring may readily be provided as a catch in the arrangement shown in FIG. 1. Since, as has been mentioned hereinbefore, the spacing between the inner surfaces of the projections 15 is at least equal to the tape width, the spring may even be curved up between the flange rims.

In the arrangement shown in FIG. 3 there is provided in the wall portion 42 an aperture 49 through which the spring 47, an end 48 of which is secured to the outer surface of the wall 37 and the width of which is smaller than the height of the tape tag 32, may enter into the space between the wall portions 38 and 39, its curvature following the flange rims 27. The spring is provided with initial tension inwardly and its free end 50 is again bent outwardly and engages the wall 42 at the end of the aperture 49 opposite the end of the wall portion 43. Thus, not only is the tape tag prevented from slipping back accidentally but also the tape tag need not be completely introduced into the guiding channel 40. That is, the driving member (such as shown in the above mentioned application Serial No. 125,603) need only deliver the tape tag up to the spring 47 which retains the tag in a position from which position the tag will be taken along by the reel projections 28. Thus, the driving member need never reach the position where it can become engaged with the reel and this materially facilitates the design and operation of the tag introducing mechanism.

As mentioned hereinbefore, the tape tag need not have a particular shape. The operation of the apparatus, however, involves an appropriate shape shown in FIGS. 3, 4, 5 and especially FIG. 6. The central part of the tag which is to be carried along by the flange is shaped in the form of a cylinder 51. At the front side a wedge-shaped part 52 is added the width of which is equal to the width of the tape. This permits the tape tag when being introduced through the guiding channel 44 to overcome the spring 47 without difficulty and to be inserted readily as a closing member into the portion 34 of the recess 24 extending into the reel hub 30. Opposite the wedge 52 a part 53 is provided which serves to secure the tape 23, for example by gluing, and has a recess 54 with the aid of which the tag may be guided by a driving member projecting through the slit 46. In order to prevent the reel hub from impeding the movements of the parts 52 and 53 joined to the cylinder, the hub is provided with the above-mentioned recess 36.

What is claimed is:

1. Take-up apparatus for tape recorders comprising a take-up reel having oblique slots formed in the flanges thereof, said means at one side of said slot projecting radially beyond the periphery of said flanges; a wall member spaced from the periphery of said reel a distance sufficent for passage of said projection through said channel and adapted to receive freely a tape tag to be introduced into said channel, the width dimension of said channel in a plane parallel with the axis of rotation of said reel being greater than the width of said reel, and a pair of side wall members operatively connected with said first mentioned wall member, each of said side wall members and said first mentioned wall member having an arcuate portion and a tangentially extending straight portion defining both an arcuate channel portion and a linear channel portion, said linear channel portion having an entrance end for receiving a tape to be wound upon said reel, a tape guide means in said linear channel portion adjacent said entrance end and catch means operative in said linear channel portion for retaining a tape tag in position within said linear channel portion for engagement by said reel flange projections.

2. Take-up apparatus according to claim 1 wherein said tape guide means comprises a wall-part extending between said pair of wall members adjacent said entrance and spaced from said first mentioned wall member, and a tape guide member adjacent the end of said wall part remote from said entrance.

3. Take-up apparatus according to claim 1 wherein said catch means comprises a curved leaf spring fixed at one end to said recorder, a slot in the straight portion of said first mentioned wall member for receiving said spring, said spring obstructing said linear channel portion against accidental removal of a tape tag therefrom.

4. Take-up apparatus for tape recorders comprising in combination a take-up reel having oblique slots formed in the flanges thereof, means at one side of each of said slots projecting radially beyond the periphery of said flanges, an arcuate channel defined by the periphery of said reel and a wall member spaced from the periphery of said reel a distance sufficient for passage of said projecting means through said channel, the width dimension of said channel being greater than the width dimension of said reel, and additional wall members defining a second channel adjoining said first named channel, said second channel first receiving a tape to be introduced and wound upon said reel.

5. Take-up apparatus for tape recorders comprising in combination a take-up reel having oblique slots formed in the flanges thereof, means at one side of said slot projecting radially beyond the periphery of said flanges, an arcuate channel defined between the reel and a wall member spaced from the periphery of said reel a distance sufficient for passage of said projecting means through said channel and adopted to receive freely a tape leg tag to be introduced into said channel, the width dimension of said channel being greater than the width dimension of said reel, a further straight wall member substantially tangential with the arcuate channel of said first wall member, and plate means operatively connected with said wall members for overlying a portion of the flanges of said reel and defining a second channel adjoining said first named channel, said second channel first receiving a tape to be introduced and wound upon said reel.

References Cited by the Examiner

UNITED STATES PATENTS

| | | | |
|---|---|---|---|
| 1,871,234 | 8/32 | Proctor | 242—71.1 X |
| 2,225,433 | 12/40 | Goldberg | 242—74 |
| 2,652,744 | 9/53 | Goldberg | 242—55.11 X |
| 2,690,883 | 10/54 | Barker et al. | 242—71 |
| 2,763,178 | 9/56 | Gottschalk | 242—55.12 X |
| 2,964,593 | 12/60 | Kleve | 242—55.12 X |
| 3,090,574 | 5/63 | Doncaster et al. | 242—55.13 |
| 3,119,574 | 1/64 | Laa | 242—55.13 |

MERVIN STEIN, *Primary Examiner.*

HARRISON R. MOSELEY, *Examiner.*

UNITED STATES PATENT OFFICE
CERTIFICATE OF CORRECTION

Patent No. 3,214,108 October 26, 1965

Friedrich Louzil

It is hereby certified that error appears in the above numbered patent requiring correction and that the said Letters Patent should read as corrected below.

Column 6, line 40, strike out "leg".

Signed and sealed this 11th day of October 1966.

(SEAL)
Attest:

ERNEST W. SWIDER
Attesting Officer

EDWARD J. BRENNER
Commissioner of Patents